US012650663B2

(12) United States Patent
Matsumoto

(10) Patent No.: US 12,650,663 B2
(45) Date of Patent: Jun. 9, 2026

(54) IMAGE FORMING APPARATUS

(71) Applicant: CANON KABUSHIKI KAISHA, Tokyo (JP)

(72) Inventor: Yasuhisa Matsumoto, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/059,350

(22) Filed: Feb. 21, 2025

(65) Prior Publication Data

US 2025/0291304 A1 Sep. 18, 2025

(30) Foreign Application Priority Data

Mar. 13, 2024 (JP) ................................ 2024-039386

(51) Int. Cl.

*G03G 21/16* (2006.01)
*G03G 15/00* (2006.01)
*G03G 21/18* (2006.01)

(52) U.S. Cl.

CPC ..... *G03G 21/1638* (2013.01); *G03G 15/5012* (2013.01); *G03G 21/1647* (2013.01); *G03G 21/1892* (2013.01); *G03G 2221/169* (2013.01)

(58) Field of Classification Search

CPC ........... G03G 21/1638; G03G 15/5012; G03G 21/1647; G03G 21/1892; G03G 2221/169

See application file for complete search history.

(56) References Cited

U.S. PATENT DOCUMENTS

2019/0212672 A1* 7/2019 Gamo ................ G03G 15/0865
2023/0136409 A1* 5/2023 Nogawa ............. H04N 1/00087 358/1.13
2023/0297013 A1* 9/2023 Takahashi .......... G03G 15/5008 399/70
2023/0391097 A1* 12/2023 Chae ........................ B41J 29/54

FOREIGN PATENT DOCUMENTS

JP 2011-175258 A 9/2011

* cited by examiner

*Primary Examiner* — David H Banh
(74) *Attorney, Agent, or Firm* — VENABLE LLP

(57) ABSTRACT

An image forming apparatus includes an apparatus body provided with an opening portion, an opening/closing member, a fixing unit, a unit configured to be attached to and detached from the apparatus body through the opening portion, and a control unit configured to execute a predetermined initializing operation based on a movement of the opening/closing member from the open position to the closed position, in a case where the control unit detects a movement of the fixing unit during a period from a movement of the opening/closing member from the closed position to the open position to the movement of the opening/closing member from the open position to the closed position, and not execute the predetermined initializing operation even if the opening/closing member is moved to the closed position, in a case where the control unit does not detect the movement of the fixing unit during the period.

18 Claims, 10 Drawing Sheets

IMAGE FORMING APPARATUS

BACKGROUND OF THE INVENTION

Field of the Invention

The present disclosure relates to an image forming apparatus that forms an image on a recording material.

Description of the Related Art

Japanese Patent Application Publication No. 2011-175258 describes opening a cover on a front side of an image forming apparatus to perform jam removal processing or pulling out a support member to the front side of the apparatus to replace a developer cartridge and a developing apparatus.

In a case where a unit attachable to and detachable from an apparatus body of the image forming apparatus has been replaced or there is a possibility that the unit has been replaced, an initializing operation of bringing the unit usable for an image forming operation is executed. However, when the initializing operation is executed each time the opening/closing member is opened/closed even though the unit is not actually replaced, this may result in inconvenience in that the image forming operation cannot be executed during a longer period (downtime), or a consumable item is consumed in an accelerated rate.

SUMMARY OF THE INVENTION

The present invention can provide an image forming apparatus capable of reducing an unnecessary initializing operation.

According to an aspect of the invention, an image forming apparatus includes an apparatus body provided with an opening portion, an opening/closing member configured to move between a closed position where the opening portion is closed and an open position where the opening portion is open, a fixing unit configured to move between a first position at which the fixing unit fixes an image on a recording material and a second position retracted from the first position, a unit used in an image forming operation of forming the image on the recording material, the unit being configured to be attached to and detached from the apparatus body through the opening portion in a state where the opening/closing member is at the open position and the fixing unit is at the second position, and a control unit configured to execute a predetermined initializing operation of bringing the unit attached to the apparatus body to be usable for the image forming operation, the control unit being configured to execute the predetermined initializing operation based on a movement of the opening/closing member from the open position to the closed position, in a case where the control unit detects a movement of the fixing unit from the first position to the second position during a period from a movement of the opening/closing member from the closed position to the open position to the movement of the opening/closing member from the open position to the closed position, and not execute the predetermined initializing operation even if the opening/closing member is moved to the closed position, in a case where the control unit does not detect the movement of the fixing unit from the first position to the second position during the period.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

In the present disclosure, an "image forming apparatus" refers to a general apparatus having a function of forming an image on a recording material (recording medium). The image forming apparatus may be a single-function printer, a copier, or a multifunction peripheral. The image forming apparatus may be an apparatus that mainly forms a color image, or may be an apparatus that mainly forms a monochrome image. In addition, the image forming apparatus may be a system (image forming system) in which an accessory device used integrally with an apparatus body of the image forming apparatus that forms an image on the recording material is connected to the apparatus body of the image forming apparatus. Examples of the accessory device include a sheet processing device (finisher) that performs processing such as binding processing on sheets on which images are formed, a conveyance device that conveys a sheet from the apparatus body of the image forming apparatus to another apparatus, and a feeding device (option feeder) that feeds a sheet toward the apparatus body of the image forming apparatus.

First Embodiment

Figure 1:
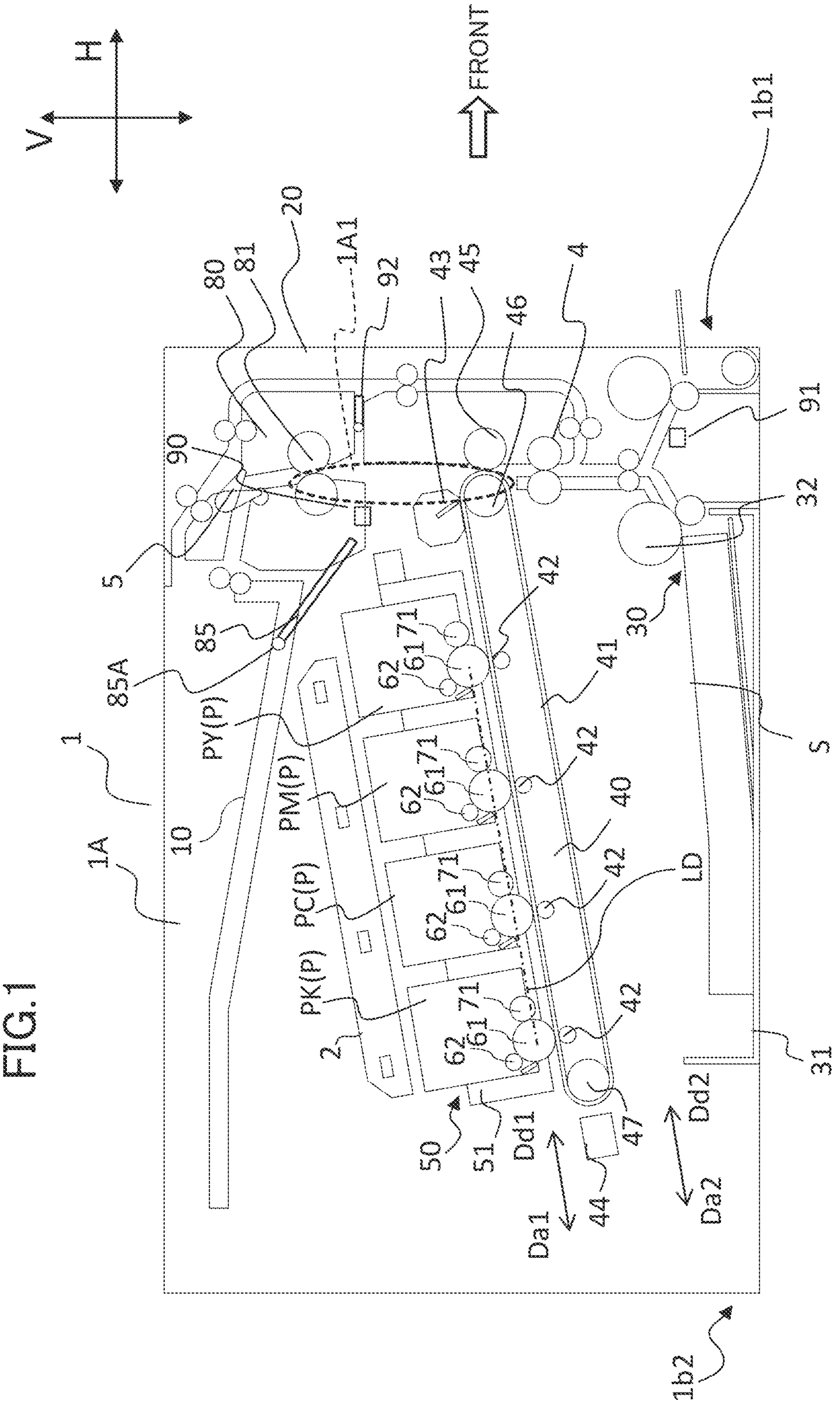
FIG. 1 is a schematic diagram of an image forming apparatus according to a first embodiment.

A printer 1 serving as an image forming apparatus according to the present embodiment will be described with reference to FIG. 1. FIG. 1 is a schematic diagram illustrating a cross-sectional configuration of the printer 1. The printer 1 is a color laser beam printer of an electrophotographic system that forms an image on a sheet S as a recording material. As the sheet S, various sheet materials that are different in size and material, such as paper such as plain paper and thick paper, a sheet material subjected to surface treatment such as coated paper, a sheet material having a special shape such as an envelope and index paper, a plastic film, and cloth, can be used.

In the following description and drawings, a vertical direction when the printer 1 is installed on a horizontal plane will be referred to as an up-down direction, and is illustrated by an up-down arrow V. A horizontal direction when the printer 1 is installed on the horizontal plane, which is orthogonal to a rotation axis direction of a photosensitive drum 61 included in the printer 1, will be referred to as a horizontal direction, and is illustrated by a left-right arrow H. One side in the horizontal direction (a side on which a door 20 is disposed, a right side in FIG. 1) will be referred to as "front" or "front side", and the other side in the horizontal direction will be referred to as "rear" or "rear side".

The printer 1 includes an apparatus body 1A, a scanner 2 serving as an exposing apparatus, a door 20 serving as an opening/closing member, a sheet feeding unit 30, a transfer unit 40, a cartridge tray unit 50, and a fixing unit 80.

In the present embodiment, the apparatus body 1A refers to a portion excluding the door 20, the scanner 2, the sheet feeding unit 30, the transfer unit 40, the cartridge tray unit 50, and the fixing unit 80 from the printer 1. The apparatus body 1A is a casing including a frame member (metal frame) constituting a frame body of the printer 1 and a cover member forming an exterior surface of the printer 1. The apparatus body 1A accommodates the scanner 2, the sheet feeding unit 30, the transfer unit 40, the cartridge tray unit 50, and the fixing unit 80.

The door 20 is an opening/closing member provided to be openable and closable with respect to the apparatus body 1A. The apparatus body 1A has an opening 1A1 (opening portion). The door 20 is movable between a closed position where the door 20 closes the opening 1A1 and an open position where the door 20 opens the opening 1A1. When the door 20 is in the closed position, an outer surface of the door 20 forms the exterior surface of the printer 1 together with an outer surface of the apparatus body 1A. The door 20 forms a front exterior surface of the printer 1 having a substantially rectangular parallelepiped shape.

A door sensor 91 for detecting whether the door 20 is opened or closed is disposed in the apparatus body 1A. The door sensor 91 is configured such that an output signal of the door sensor 91 differs between a state where the door 20 is at the closed position and a state where the door 20 is at the open position.

The sheet feeding unit 30 includes a stacking tray 31 (sheet accommodation unit, cassette) on which the sheets S are stacked, a feed roller 32 serving as a feeding member, and a separation roller that forms a separation nip with the feed roller 32. The stacking tray 31 can be pulled out forward from the apparatus body 1A. A user can replenish sheets S onto the stacking tray 31 in a state where the stacking tray 31 is pulled out from the apparatus body 1A. The stacking tray 31 may be pulled out while the door 20 is closed.

The cartridge tray unit 50 includes a tray 51 and cartridges PY, PM, PC, and PK. The tray 51 is a support member that supports the cartridges PY to PK. The tray 51 is a drawer unit that is inserted into the apparatus body 1A in a drawable manner.

The cartridges PY, PM, PC, and PK contain toners (developers) of yellow (Y), magenta (M), cyan (C), and black (K), respectively. The cartridges PY, PM, PC, and PK have the same configuration except that the colors of the contained toners are different. Therefore, the configuration and operation of one of the cartridges PY, PM, PC, and PK will be described, and description of the other cartridges may be omitted. In addition, when it is not necessary to distinguish the cartridges PY, PM, PC, and PK, any one of the cartridges PY, PM, PC, and PK may be simply referred to as a cartridge P.

The cartridge tray unit 50 includes four photosensitive drums 61 serving as image bearing members, four charging rollers 62 serving as charging members, and four developing rollers 71 serving as developer bearing members or developing members. The cartridge tray unit 50 includes four cleaning blades serving as cleaning members. The rotation axis direction of the photosensitive drum 61, the rotation axis direction of the developing roller 71, and the rotation axis direction of the charging roller 62 are parallel.

The photosensitive drum 61, the charging roller 62, the developing roller 71, and the cleaning member may be provided in either the cartridge P or the tray 51. That is, the cartridge P including at least one member selected from the group including the photosensitive drum 61, the charging roller 62 (charging member), the developing roller 71 (developing member), and the cleaning member is an example of a "unit" in the present disclosure. In the present embodiment, each of the cartridges PY, PM, PC, and PK includes one photosensitive drum 61, one charging roller 62, one developing roller 71, and one cleaning member.

The transfer unit 40 includes a transfer belt 41 serving as an intermediate transfer member, four primary transfer rollers 42, a cleaning unit 43, a driving roller 46 that drives the transfer belt 41, and a tension roller (driven roller) 47. In addition, the printer 1 according to the present embodiment includes an optical sensor 44 that detects a toner image transferred to the transfer belt 41. In the present embodiment, the transfer belt 41 is disposed under the four photosensitive drums 61, and abuts on the photosensitive drums 61 such that a primary transfer portion is formed between the transfer belt 41 and the photosensitive drums 61.

The printer 1 also includes a secondary transfer roller 45 that abuts on the transfer belt 41 to form a secondary transfer portion. The rotation axis direction of the primary transfer roller 42, the rotation axis direction of the driving roller 46, the rotation axis direction of the tension roller 47, and the rotation axis direction of the secondary transfer roller 45 are parallel to each other. A registration roller pair 4 is disposed before the secondary transfer portion (upstream in the sheet conveyance direction).

The fixing unit 80 includes a fixing unit 81 and a reversing unit 5. The fixing unit 81 includes a rotary member pair that nips and conveys the sheet S, and a heating unit that heats a toner image on the sheet S. In the present embodiment, the rotary member pair is a roller pair including a heating roller (fixing roller) and a pressurizing roller, and the heating unit is a halogen lamp that heats the heating roller. As a rotary member constituting the rotary member pair, a cylindrical film or an endless belt stretched around a plurality of rollers may be used. In addition, the heating unit may be a heater substrate in which a pattern of a heating element is printed on a ceramic substrate, or a coil unit for heating a conductive layer in the heating roller or the film by induction heating. The reversing unit 5 includes a reverse conveyance roller pair that reversely conveys the sheet S to perform double-sided printing, and a guide unit that guides the sheet S having passed through the fixing unit 81 to the sheet discharge roller pair or the reverse conveyance roller pair.

Relationship Between Cartridge Tray Unit and Fixing Unit

Next, the movement of the cartridge tray unit 50 in the present embodiment will be described with reference to FIG. 1. The cartridge tray unit 50 is movable from the inside to the outside of the apparatus body 1A. The apparatus body 1A has a first end **1*b*1 (heading edge) where the opening 1A1 is provided, and a second end 1*b*2 (trailing edge) opposite to the first end 1*b*1. The cartridge tray unit 50 is movable through the opening 1A1 between an inner position where the cartridge tray unit 50 is accommodated inside the apparatus body 1A and an outer position where the cartridge tray unit 50 protrudes outside the apparatus body 1A. The inner position is a position of the cartridge tray unit 50 when the printer 1 executes an image forming operation. The outer position is a position of the cartridge tray unit 50 where the cartridge P is allowed to be attached to or detached from the tray 51. The cartridge tray unit 50 of the present embodiment can be detached toward the front side of the printer 1 and attached toward the rear side of the printer 1** in the horizontal direction (H).

The direction in which the cartridge tray unit 50 moves from the inner position to the outer position will be referred to as a tray detachment direction Dd1, and the direction opposite to the tray detachment direction Dd1 will be referred to as a tray attachment direction Da1. The tray detachment direction Dd1 can be referred to as a direction from the second end 1*b*2 toward the first end 1*b*1. The fixing unit 80 is disposed on one end side (the side on which the first end 1*b*1 is disposed) of the apparatus body 1A in the horizontal direction.

The transfer unit 40 is movable from the inside to the outside of the apparatus body 1A. The transfer unit 40 is movable through the opening 1A1 between an inner position where the transfer unit 40 is accommodated inside the apparatus body 1A and an outer position where the transfer unit 40 protrudes outside the apparatus body 1A. The inner position is a position of the transfer unit 40 when the printer 1 executes an image forming operation. The direction in which the transfer unit 40 moves from the inner position to the outer position will be referred to as a transfer detachment direction Dd2, and the direction opposite to the transfer detachment direction Dd2 will be referred to as a transfer attachment direction Da2. The transfer detachment direction Dd2 can be referred to as a direction from the second end 1*b*2 toward the first end 1*b*1.

Image Forming Operation

Next, an image forming operation of the printer 1 in the present embodiment will be described with reference to FIG. 1. The image forming operation is a series of operations by which the printer 1 forms an image on the sheet S while conveying the sheet S one by one.

Figure 4:
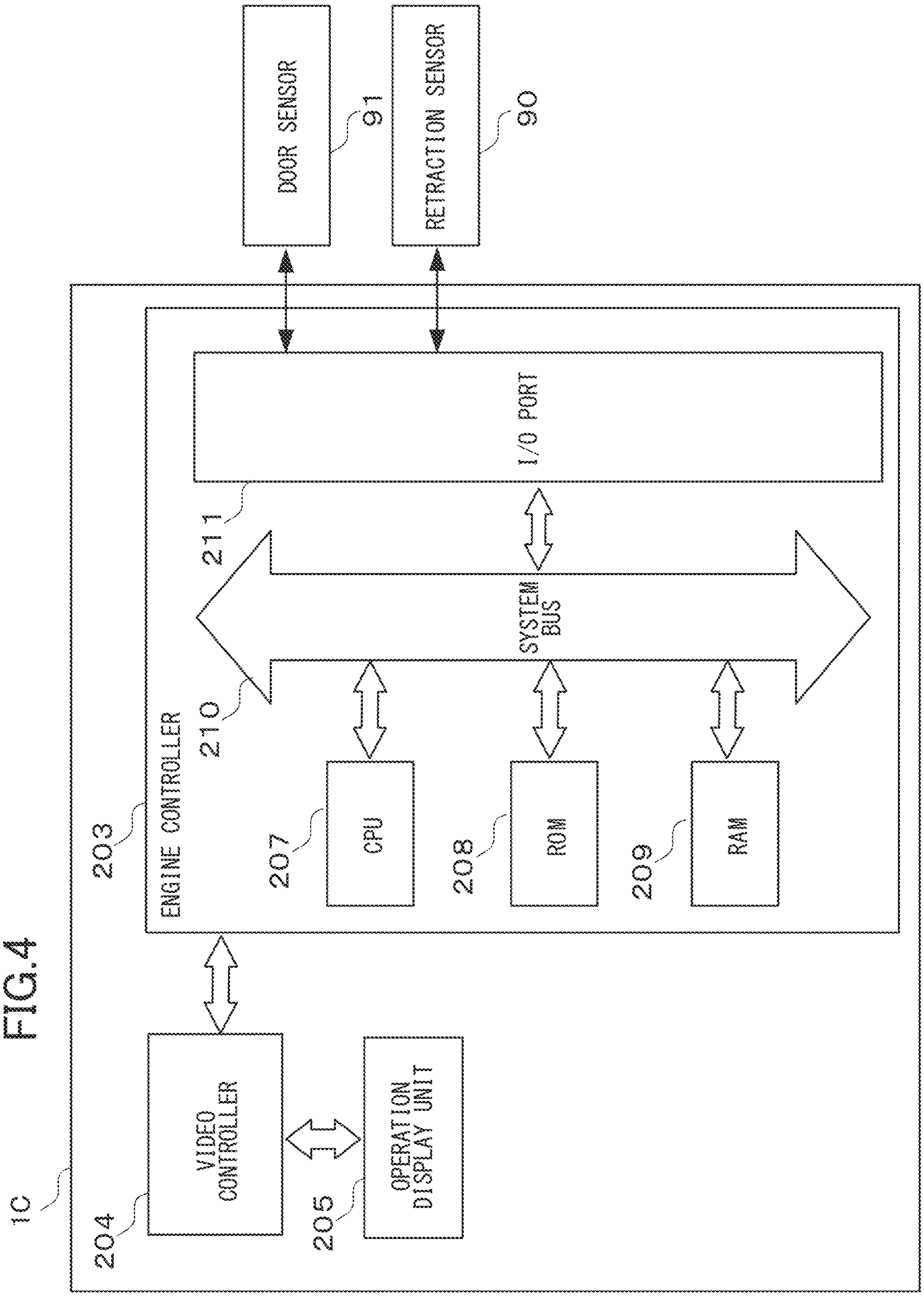
FIG. 4 is a hardware configuration of the image forming apparatus according to the first embodiment.

The printer 1 includes a video controller 204 and an engine controller 203 (FIG. 4). The video controller 204 instructs the engine controller 203 to execute an image forming operation based on image information received from an external host device. The host device is, for example, a personal computer, an image reader, or a facsimile. The engine controller 203 controls various units involved in creating a toner image and conveying the sheet S to execute an image forming operation.

In the image forming operation, the photosensitive drums 61 and the transfer belt 41 are rotationally driven. The charging roller 62 receives a charging voltage, and uniformly charge the surface of the corresponding photosensitive drum 61. The scanner 2 irradiates each of the photosensitive drums 61 with laser light corresponding to image information to expose the surface of each of the photosensitive drums 61. As a result, an electrostatic latent image corresponding to the image information is formed on the surface of each of the photosensitive drums 61.

The developing roller 71 bears toner and supplies the toner to the corresponding photosensitive drum 61. A developing voltage is applied to the developing roller 71, and the electrostatic latent image formed on the corresponding photosensitive drum 61 is developed by the toner supplied from the developing roller 71. As a result, a toner image is formed on the surface of each of the photosensitive drums 61. In the present embodiment, a contact developing method in which development is performed in a state where the developing roller 71 abuts on the corresponding photosensitive drum 61 is used, but a jumping developing method in which development is performed in a state where there is a gap between the developing roller 71 and the corresponding photosensitive drum 61 may be used.

When a full-color image is formed, a toner image of each color is formed on each of the photosensitive drums 61. The toner image of each color formed on each of the photosensitive drums 61 is primarily transferred onto the transfer belt 41 by the corresponding primary transfer roller 42, and is conveyed toward the secondary transfer portion formed between the transfer belt 41 and the secondary transfer roller 45. The toner that has not been transferred to the transfer belt 41 is removed from the photosensitive drum 61 by the cleaning member.

On the other hand, in the sheet feeding unit 30, one sheet S is fed from a bundle of sheets S stacked on the stacking tray 31 by the feed roller 32 and the separation roller, and is conveyed toward the secondary transfer portion. In the secondary transfer portion, the toner image is transferred from the transfer belt 41 to the sheet S (secondary transfer). The toner that has not been transferred to the sheet S is removed from the transfer belt 41 by a cleaning blade 43A serving as a cleaning member provided in the cleaning unit 43.

The sheet S to which the toner image has been transferred in the secondary transfer portion is conveyed to the fixing unit 80. The fixing unit 81 fixes the toner image onto the sheet S by heating and pressurizing the toner image on the sheet S while conveying the sheet S nipped at the nip portion (fixing nip) of the rotary member pair. The sheet S that has passed through the fixing nip is discharged to a sheet discharge tray 10 provided on an upper surface of the apparatus body 1A by the sheet discharge roller pair of the reversing unit 5.

In the case of double-sided printing in which images are formed on both sides of the sheet S, the sheet S that has passed through the fixing nip in a state where an image is formed on a first surface is guided to the reverse conveyance roller pair of the reversing unit 5. Further, the sheet S is switched back by the reverse conveyance roller pair, and is conveyed back toward the secondary transfer portion via a duplex conveyance path formed inside the door 20. Then, after an image is formed on a second surface of the sheet S while the sheet S passes through the secondary transfer portion and the transfer nip for the second time, the sheet S is discharged to the sheet discharge tray 10 by the sheet discharge roller pair.

Initializing Operation

Next, an initializing operation of the printer 1 in the present embodiment will be described. The initializing operation is an operation of bringing the printer 1 into a state where an image forming operation can be executed (initial state, standby state). The initializing operation is executed when the door 20 attached to the apparatus body 1A is moved from the open position to the closed position. In the present embodiment, at the time of jam removal processing or at the time of replacing the cartridge P, the fixing unit 80, or the transfer unit 40, which is a unit or a consumable item attachable to and detachable from the apparatus body 1A, the initializing operation is executed when the door 20 in the open state is closed. However, as will be described below, the contents of the operation executed in the initializing operation may vary depending on conditions such as whether the cartridge has been replaced.

Relationship Between Cartridge Tray Unit and Fixing Unit

Figure 2:
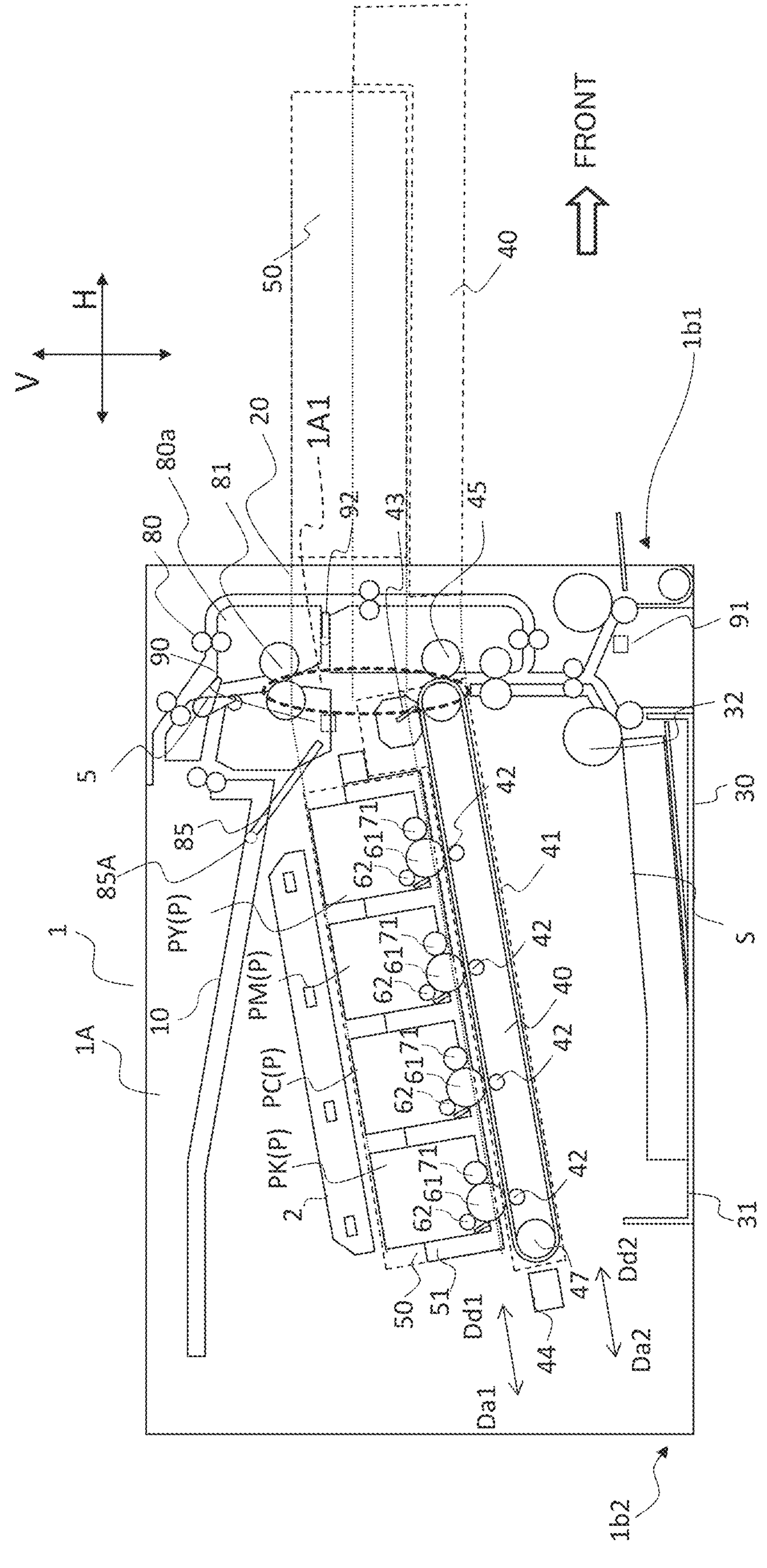
FIG. 2 is a schematic diagram of the image forming apparatus according to the first embodiment.

Next, a positional relationship between the cartridge tray unit 50 and the fixing unit 80 in the present embodiment will be described with reference to FIG. 2. FIG. 2 illustrates movement spaces of the cartridge tray unit 50 and the transfer unit 40 of FIG. 1.

The cartridge tray unit 50 passes through a predetermined space when moving from the inner position to the outer position. This predetermined space will be referred to as a movement space or a movement trajectory of the cartridge tray unit 50. In addition, the space through which the transfer unit 40 passes when moving from the inner position to the outer position will be referred to as a movement space or a movement trajectory of the transfer unit 40.

Figure 3:
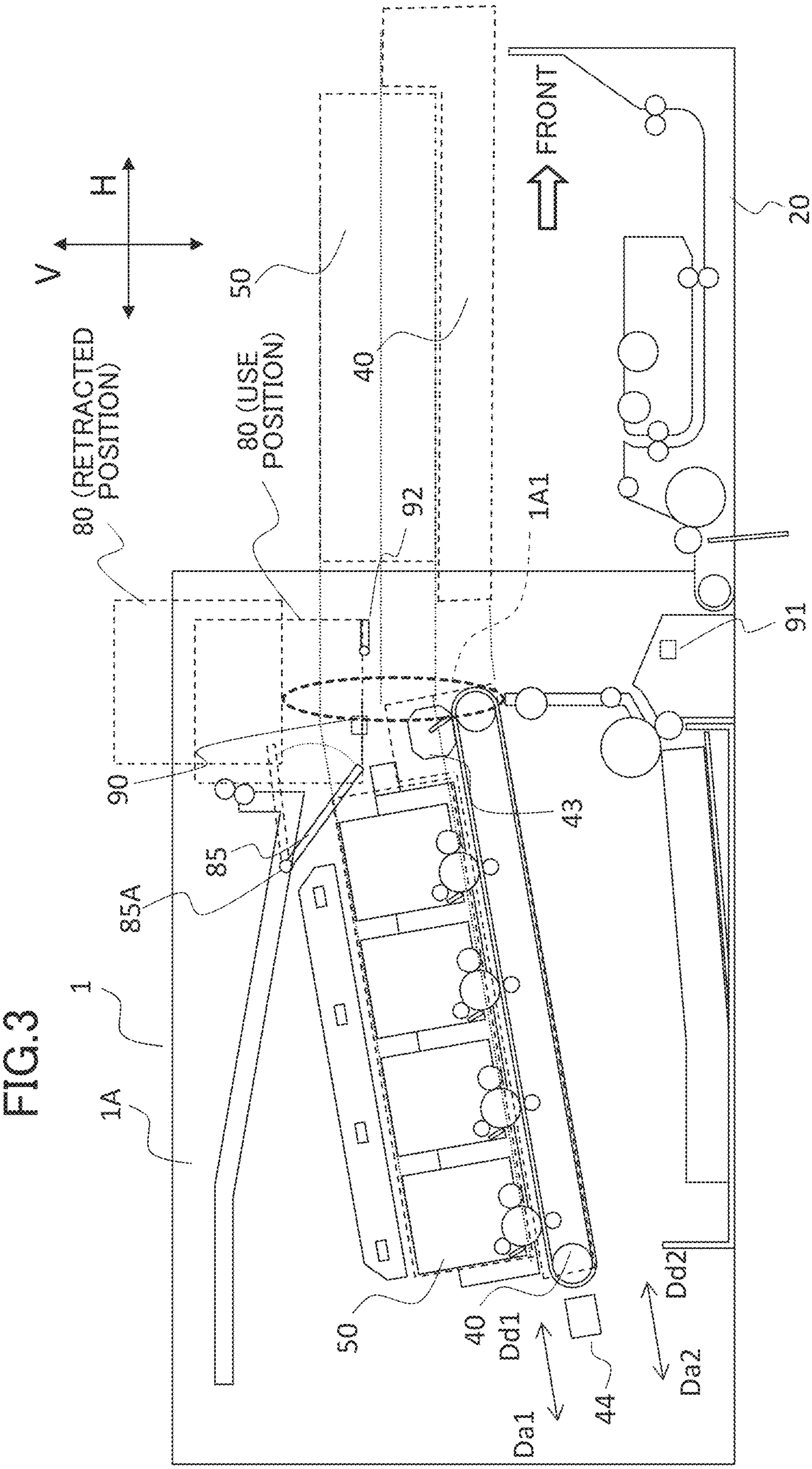
FIG. 3 is a schematic diagram of the image forming apparatus according to the first embodiment.

As illustrated in FIG. 3, the fixing unit 80 is movable with respect to apparatus body 1A between a use position (first position) and a retracted position (second position). FIG. 3 illustrates a state in which the door 20 is at the open position in addition to the movement space of the fixing unit 80 of FIG. 2. The use position is a position of the fixing unit 80 when the printer 1 executes an image forming operation, that is, when the fixing unit 80 performs a fixing operation of fixing an image on a recording material. The retracted position is a position where the fixing unit 80 is retracted upward from the use position.

As illustrated in FIG. 2, the use position of the fixing unit 80 overlaps the movement space of the cartridge tray unit 50. That is, when the fixing unit 80 is at the use position, at least a part of the fixing unit 80 is located inside the movement space of the cartridge tray unit 50. Therefore, in a state where the fixing unit 80 is at the use position, the cartridge tray unit 50 is prevented from moving from the inner position to the outer position. That is, in the state where the fixing unit 80 is at the use position, the cartridge P cannot be attached to or detached from the apparatus body 1A.

When the fixing unit 80 is at the retracted position, the entire fixing unit 80 is located outside the movement space of the cartridge tray unit 50. Therefore, in the state where the fixing unit 80 is at the use position, the cartridge tray unit 50 is allowed to move from the inner position to the outer position. That is, in a state where the door 20 is at the open position and the fixing unit 80 is at the retracted position (second position), the cartridge P (unit) is allowed to be attached to and detached from the apparatus body 1A.

The fixing unit 80 includes a fixing frame member 80*a* that supports the fixing unit 81. When the fixing unit 80 moves from the use position to the retracted position, the fixing frame member 80*a* is displaced with respect to the apparatus body 1A while supporting the fixing unit 81. In addition, the fixing frame member 80*a* forms an outer surface of the fixing unit 80, and the movement space when the fixing unit 80 moves between the use position and the retracted position is substantially the same as the movement trajectory of the fixing frame member 80*a*.

Retraction Mechanism of Fixing Unit

Next, a retraction mechanism of the fixing unit 80 in the present embodiment will be described with reference to FIG. 3. In order to pull out the cartridge tray unit 50 to the outside of the apparatus body 1A, first, the door 20 is moved to the open position as illustrated in FIG. 3. Next, the fixing unit 80 is moved to the retracted position outside the movement space of the cartridge tray unit 50.

The printer 1 includes a coupling member 85 (a fixing coupling member or a fixing link) movably coupled to the apparatus body 1A. The fixing unit 80 is coupled to the apparatus body 1A via the coupling member 85. The coupling member 85 is rotatable about the rotation center 85A. When the cartridge tray unit 50 is pulled out to the outside of the apparatus body 1A, the coupling member 85 is moved to the outside of the movement space of the cartridge tray unit 50. The fixing unit 80 is movable from the use position to the retracted position and from the retracted position to the use position in accordance with the movement of the cartridge tray unit 50 in a state where the fixing unit 80 is supported by the coupling member 85.

In the present embodiment, the movement of the fixing unit 80 to the retracted position is started by a user operation of an operation lever 92 serving as an operation unit. When receiving an instruction from the user by operating the operation lever 92, a retraction driving unit 300 (FIG. 5) to be described below rotates the coupling member 85 to move the fixing unit 80 from the use position to the retracted position or from the retracted position to the use position. The operation lever 92 and the retraction driving unit 300 are disposed in the apparatus body 1A. For example, the retraction driving unit 300 drives a motor connected to the coupling member 85 to rotate the coupling member 85, thereby moving the fixing unit 80. This motor functions as an actuator (driving unit) for moving the fixing unit 80.

Note that the trigger for the retraction mechanism to move the fixing unit 80 is not limited to the user operation of the operation lever 92. For example, the retraction mechanism may move the fixing unit 80 in response to a user operation of a button on an operation display unit 205. In addition, when a control unit 1C receives a user operation on an operation screen (driver screen) in an external host device communicably connected to the control unit 1C from the host device, the retraction mechanism may move the fixing unit 80.

In addition, the mechanical configuration of the retraction mechanism of the fixing unit 80 is not limited to what has been described above. For example, the fixing unit 80 may be attached to a slide member that is vertically slidable, and a retraction mechanism that drives a pinion gear meshing with a rack portion of the slide member to be rotated by a motor may be used. Alternatively, the fixing unit 80 may be supported in such a manner as to be slidable in a predetermined direction along a rail of the apparatus body 1A, and the user may manually move the fixing unit 80 in the predetermined direction.

The position of the fixing unit 80 in the present embodiment is detected by a retraction sensor 90 provided in the apparatus body 1A. The retraction sensor 90 is configured such that an output signal is different between a state in which the fixing unit 80 is at the use position and a state in which the fixing unit 80 is at the retracted position. That is, the retraction sensor 90 is a sensor that outputs a signal corresponding to the position of the fixing unit 80.

As described above, in the present embodiment, the cartridge tray unit 50 is detached and the cartridge P is replaced in a state where the fixing unit 80 is retracted from the use position to the retracted position.

In the present embodiment, the movement trajectory of the transfer unit 40 does not overlap the fixing unit 80 at the use position. However, the transfer unit 40 may be detached and the transfer unit 40 may be replaced or maintained in a state where the fixing unit 80 is retracted from the use position to the retracted position. In addition, the movement trajectory of the transfer unit 40 may be configured to overlap the fixing unit 80 at the use position.

In addition, instead of the configuration in which the cartridge P is replaced or the like in a state where the fixing unit 80 is at the retracted position, that is, in a state where the fixing unit 80 is attached to the apparatus body 1A, the cartridge P may be replaced or the like in a state where the fixing unit 80 is detached from the apparatus body 1A.

Hardware Configuration

Next, a hardware configuration in the present embodiment will be described with reference to FIG. 4. The printer 1 includes a control unit 1C including an operation display unit 205, a video controller 204, and an engine controller 203. The control unit 1C functions as a control circuit that controls an operation of the image forming apparatus.

The video controller 204 transmits a state of the printer 1 received from the engine controller 203 to the operation display unit 205. The operation display unit 205 includes a display unit such as a liquid crystal panel and an input unit such as a physical button or a touch panel function of the liquid crystal panel. The operation display unit 205 switches a display content of the display unit based on the state of the printer 1 received from the video controller 204. The video controller 204 also transmits image information and a print instruction received from an external host device to the engine controller 203.

The engine controller 203 includes a CPU 207, a ROM 208, and a RAM 209. The CPU 207 loads a program and various types of data into the ROM 208, and executes the program using the RAM 209 as a work area. The ROM 208 is an example of a computer-readable non-transitory storage medium. The RAM 209 is an example of a storage unit that stores information (e.g., retraction history information or disconnection history information to be described below) used for controlling the printer 1.

The above-described elements (203, 204, 205) are connected to each other via a bidirectionally accessible system bus 210, and are accessible to an I/O port 211. An actuator (not illustrated) is connected to each I/O port 211, and controls each actuator that realizes an image forming operation and an initializing operation via the I/O port 211. The actuator includes a motor for rotationally driving the photosensitive drum 61 and the transfer belt 41, and a motor for rotationally driving the feed roller 32.

In addition, a door sensor 91 and a retraction sensor 90 are also connected to each I/O port 211. The CPU 207 can detect an open/closed state (an open position or a closed position) of the door 20 and a position (a use position or a retracted position) of the fixing unit 80 via the I/O port. The door sensor 91 and the retraction sensor 90 may be, for example, contact switches that detects contacts with detection targets (the door 20 and the fixing unit 80), or may be optical sensors each including a light emitting element and a light receiving element and optically detects partial portions of the detection targets.

Functional Block

Figure 5:
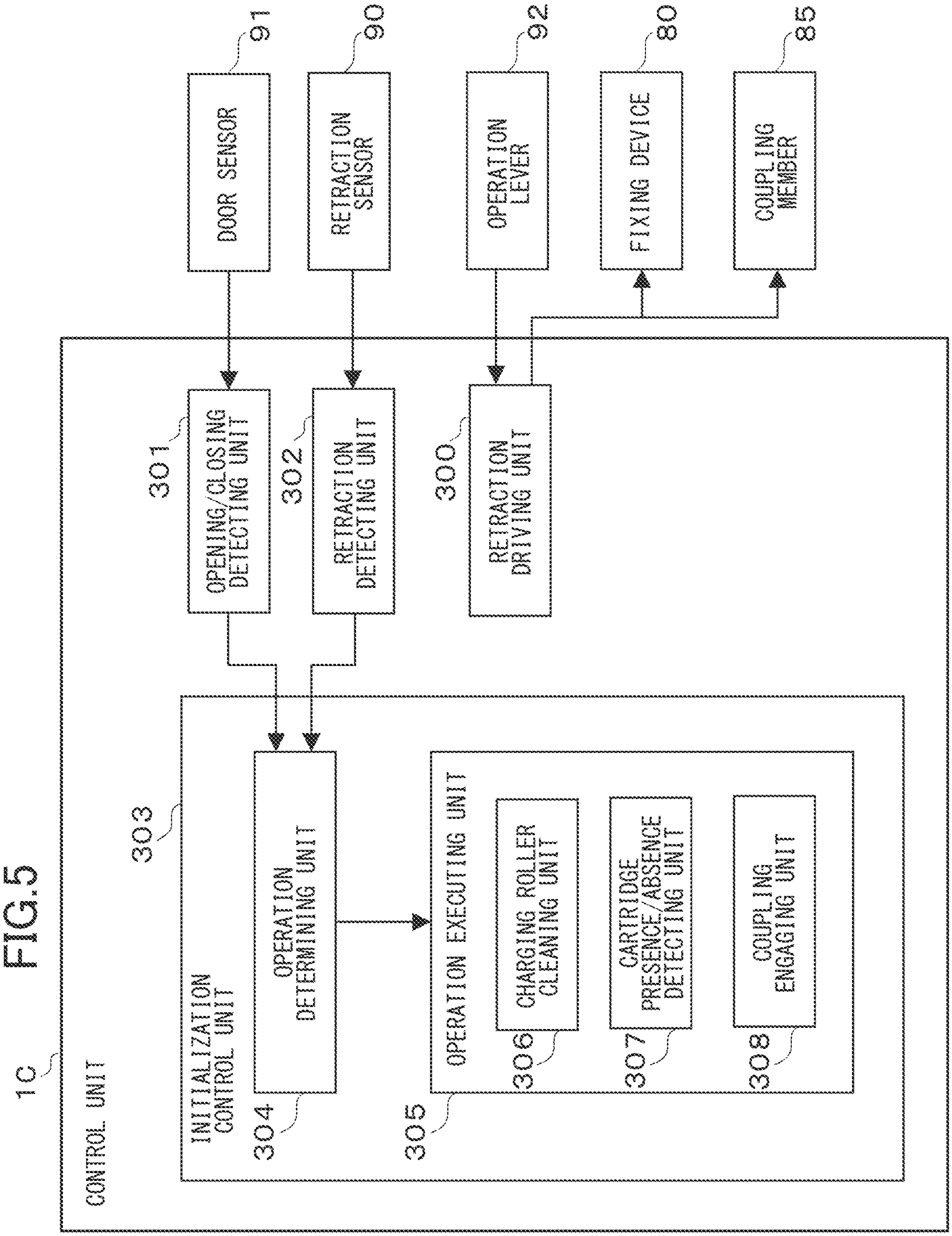
FIG. 5 is a functional block diagram of the image forming apparatus according to the first embodiment.

Next, the control unit 1C in the present embodiment is divided into blocks, each for a function achievement unit, as illustrated in FIG. 5. The control unit 1C includes a retraction driving unit 300, an opening/closing detecting unit 301, a retraction detecting unit 302, and an initialization control unit 303.

The retraction driving unit 300 moves the fixing unit 80 from the use position to the retracted position or moves the fixing unit 80 from the retracted position to the use position according to a user operation of the operation lever 92. The opening/closing detecting unit 301 detects whether the door 20 of the apparatus body 1A is at the open position or the closed position based on a detection signal of the door sensor 91. The retraction detecting unit 302 detects whether the fixing unit 80 moved by the retraction driving unit 300 is at the use position or the retracted position based on a detection signal of the retraction sensor 90. The retraction detecting unit 302 is an example of a detection unit capable of detecting a movement of the fixing unit 80 from the use position (first position) to the retracted position (second position).

The initialization control unit 303 includes an initializing operation determining unit (hereinafter, referred to as an operation determining unit 304) and an initializing operation executing unit (hereinafter, referred to as an operation executing unit 305).

The operation determining unit 304 determines a content of an initializing operation to be executed based on door opening/closing information from the opening/closing detecting unit 301 and position information of the fixing unit 80 from the retraction detecting unit 302. The operation executing unit 305 executes the initializing operation based on the content of the initializing operation determined by the operation determining unit 304. For example, when the cartridge P is replaced, the operation executing unit 305 of the present embodiment executes an initializing operation including a charging roller cleaning operation, a cartridge presence/absence detecting operation, and a coupling engaging operation.

Hereinafter, the initializing operation including the charging roller cleaning operation, the cartridge presence/absence detecting operation, and the coupling engaging operation will be referred to as an "initializing operation accompanying cartridge replacement". Each of the charging roller cleaning operation, the cartridge presence/absence detecting operation, and the coupling engaging operation is an example of a predetermined initializing operation performed when there is a possibility that the cartridge P, which is an example of a "unit", is replaced.

The initialization control unit 303 may be capable of executing an initializing operation other than the "initializing operation accompanying cartridge replacement". For example, in a case where it is detected that jam removal processing has been performed during a period in which the door 20 is open, an operation of causing the cleaning unit 43 to remove foreign matter that may be attached onto the transfer belt 41 by rotationally driving the transfer belt 41 may be performed as the initializing operation.

A charging roller cleaning unit 306 executes a charging roller cleaning operation of cleaning the charging roller 62. In the charging roller cleaning operation, voltage application to the charging roller 62 and stop of the voltage application are alternately repeated to clean toner that may have scattered and adhered to the charging roller 62 at the time of cartridge replacement is cleaned. Specifically, by alternately repeating voltage application to the charging roller 62 and stop of the voltage application in a state where the photosensitive drum 61 and the charging roller 62 are rotationally driven, toner that may have adhered to the charging roller 62 is transferred to the photosensitive drum 61. In the present embodiment, voltage application for 500 ms and stop of the voltage application for 500 ms are performed as one set of operations, and 10 sets of operations are repeated in one charging roller cleaning operation.

The method of the charging roller cleaning operation is not limited thereto. For example, a cleaning member for cleaning the charging roller 62 may be installed. In this case, the charging roller cleaning operation may be an operation of rotationally driving the charging roller 62 over a predetermined period.

The cartridge presence/absence detecting unit 307 executes a cartridge presence/absence detecting operation of detecting whether the cartridges PY, PM, PC, and PK are present or absent. In the cartridge presence/absence detecting operation, it is detected whether the cartridges are present or absent by detecting toner patterns (patch images) formed on the transfer belt 41 using the cartridges PY, PM, PC, and PK, respectively, using the optical sensor 44.

The method of the cartridge presence/absence detecting operation is not limited thereto. For example, a memory may be attached to the cartridge P, and the control unit 1C may determine whether the cartridge P is present or absent by reading information from the memory.

The coupling engaging unit 308 executes a coupling engaging operation of engaging a coupling provided in the cartridge P with a coupling provided in the apparatus body 1A. The engagement between the couplings enables transmission of drive from a motor (drive source) in the apparatus body 1A to the photosensitive drum 61. Specifically, the photosensitive drum 61 is driven by the motor in the following order: forward rotation drive for 300 ms→reverse rotation drive for 300 ms→forward rotation drive for 300 ms. As a result, in a configuration (e.g., a dog clutch) in which the coupling on the cartridge side and the coupling on the apparatus body side can be engaged at a predetermined relative rotation angle, the couplings are engaged with each other.

Procedure of Cartridge Replacement

Figure 6A:
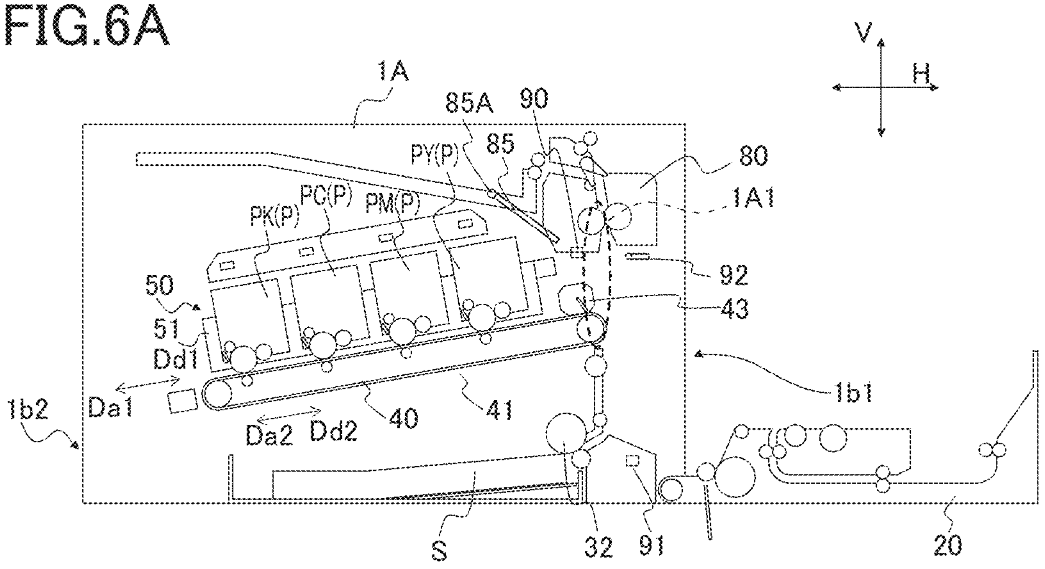
FIGS. 6A to 6C are diagrams for explaining cartridge replacement in the image forming apparatus according to the first embodiment.
Figure 6B:
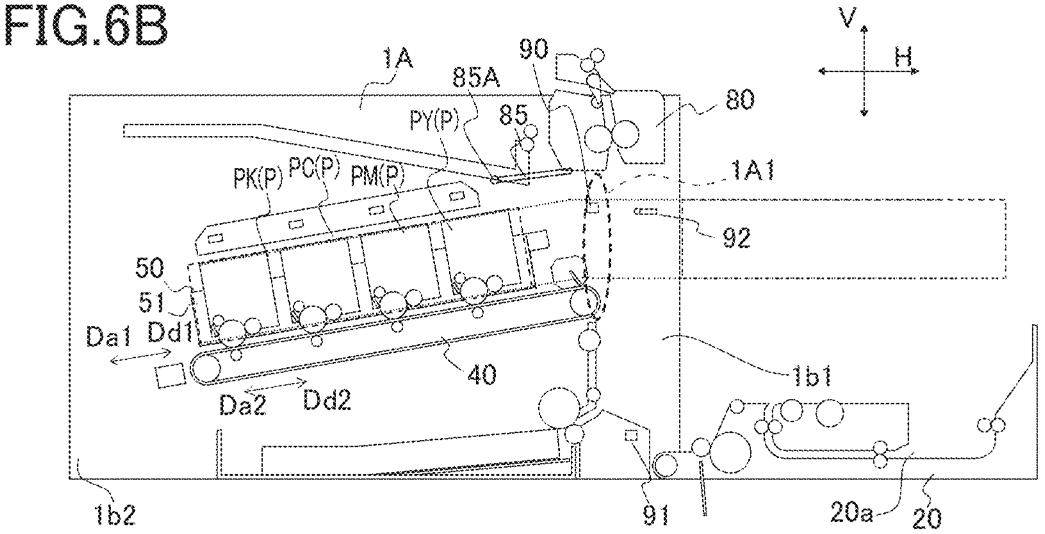
Figure 6C:
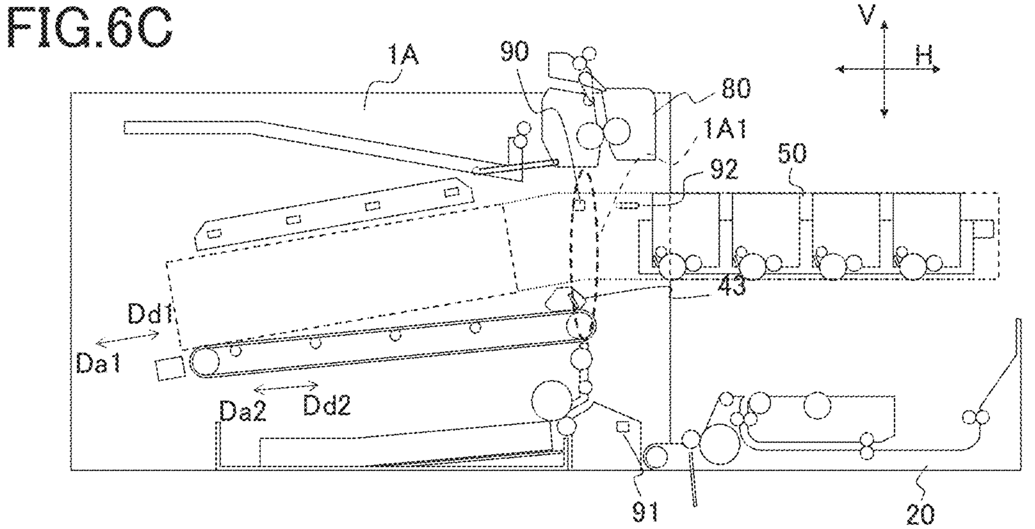

Next, a procedure of cartridge replacement in the present embodiment will be described with reference to FIGS. 6A to 6C. FIG. 6A is a cross-sectional view of the printer 1 in a state where the door 20 is open. FIG. 6B is a cross-sectional view of the printer 1 in a state where the fixing unit 80 is retracted from the use position to the retracted position from the state of FIG. 6A. FIG. 6C is a cross-sectional view of the printer 1 in a state where the cartridge tray unit is pulled out from the state of FIG. 6B.

In order to replace the cartridge P, first, the user moves the door 20 from the closed position to the open position as illustrated in FIG. 6A. The opening/closing detecting unit 301 detects that the door 20 has moved from the closed position to the open position based on a signal of the door sensor 91.

Next, when the user operates the operation lever 92, the retraction driving unit 300 moves the fixing unit 80 from the use position to the retracted position as illustrated in FIG. 6B. The retraction detecting unit 302 detects that the fixing unit 80 has moved from the use position to the retracted position based on a signal of the retraction sensor 90.

Next, as illustrated in FIG. 6C, the user pulls out the cartridge tray unit 50 from the inner position to the outer position of the apparatus body 1A. The user replaces a certain cartridge P of the cartridge tray unit 50. When the replacement of the cartridge P is finished, the user pushes the cartridge tray unit 50 back from the outer position to the inner position (FIG. 6B).

After pushing back the cartridge tray unit 50, the user operates the operation lever 92. The retraction driving unit 300 moves the fixing unit 80 from the retracted position to the use position (FIG. 6A). The retraction detecting unit 302 detects that the fixing unit 80 has moved from the retracted position to the use position based on a signal of the retraction sensor 90.

Finally, the user moves the door 20 from the open position to the closed position. The opening/closing detecting unit 301 detects that the door 20 has moved from the open position to the closed position based on a signal of the door sensor 91. Thus, the replacement operation of the cartridge P is completed.

Initializing Operation Accompanying Cartridge Replacement

When there is a possibility that one or more cartridges P have been replaced in a case where the door 20 is opened and closed, the control unit 1C executes an initializing operation accompanying the replacement of the cartridges in order to bring the printer 1 into an image formable state.

In the present embodiment, when the opening/closing of the door 20 is detected and the movement of the fixing unit 80 to the retracted position is detected during the period in which the door 20 is open, the operation determining unit 304 determines that there is a possibility that one or more cartridges P have been replaced. In this case, the operation determining unit causes the RAM 209 to store information indicating that the fixing unit 80 has been retracted during the above-described period.

Hereinafter, information regarding whether the fixing unit 80 has moved to the retracted position during the period in which the door 20 is open will be referred to as "retraction history information". The retraction history information indicating that the fixing unit 80 has moved to the retracted position is set as retraction history "present". The retraction history information indicating that the fixing unit 80 has not moved to the retracted position is set as retraction history "absent".

The operation executing unit 305 executes an initializing operation determined in advance according to the retraction history information based on the movement of that the door 20 from the open position to the closed position. Specifically, the operation executing unit 305 of the present embodiment executes an initializing operation accompanying cartridge replacement in a case where the retraction history is "present". On the other hand, the operation executing unit 305 of the present embodiment does not execute an initializing operation accompanying cartridge replacement in a case where the retraction history is "absent". In this case, the operation executing unit 305 may execute another initializing operation (preparing operation) set in advance. That is, when the fixing unit 80 has not moved to the retracted position during a period in which the door 20 is open, the operation executing unit 305 may execute a preparing operation not including the predetermined initializing operation based on the movement of the door 20 from the open position to the closed position. The preparing operation in this case is an operation of bringing the printer 1 into an image formable state regardless of whether a cartridge has been replaced, and an image forming operation is started after the preparing operation is completed. The preparing operation includes, for example, an operation of a unit other than the cartridge P in an electrophotographic engine (for example, preheating the fixing unit 80 and raising the charging voltage, the developing voltage, the transfer voltage, or the like with the high-voltage circuit board).

Control Flow

Figure 7:
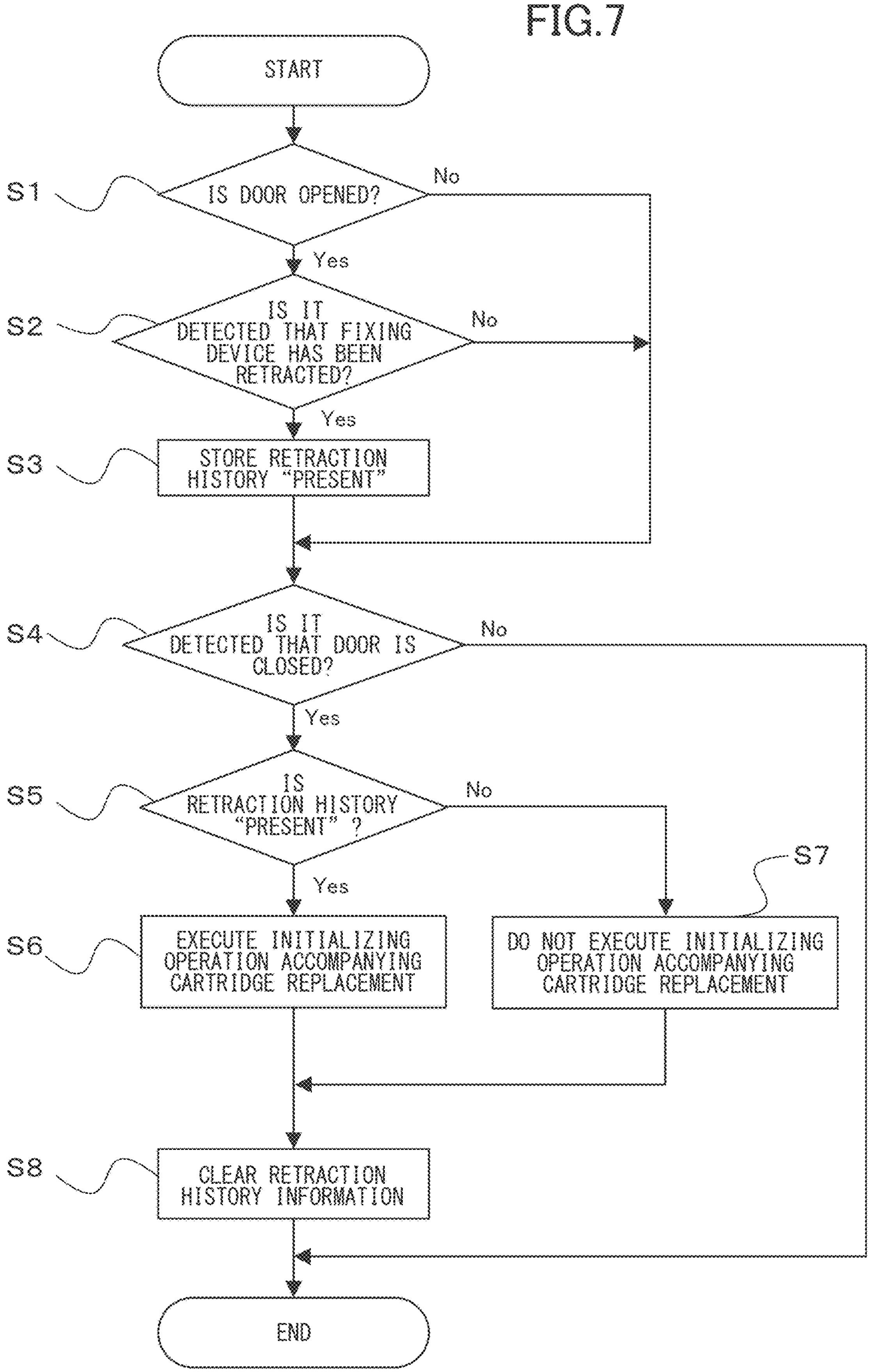
FIG. 7 is a flowchart illustrating control according to the first embodiment.

Next, a control flow of an initializing operation in the present embodiment will be described with reference to FIG. 7. The flowchart illustrated in FIG. 7 is started when an image forming operation is completed. That is, this flow is continuously executed during a period in which the main power supply of the printer 1 is turned on and the printer 1 is not executing an image forming operation (when no image is formed). Each step of this flow is executed by any functional block of the control unit 1C.

The operation determining unit 304 monitors whether the fixing unit 80 is retracted while the door 20 is open based on detection results of the opening/closing detecting unit 301 and the retraction detecting unit 302 (S1 to S3). That is, the opening/closing detecting unit 301 detects whether the door 20 of the apparatus body 1A is at the open position based on a signal of the door sensor 91 (S1). The retraction detecting unit 302 detects whether the fixing unit 80 has moved from the use position to the retracted position based on a signal of the retraction sensor 90 (S2).

When the retraction detecting unit 302 detects that the fixing unit 80 has moved to the retracted position in a state where the opening/closing detecting unit 301 detects that the door 20 is opened (Yes in S1→Yes in S2), the operation determining unit 304 determines that there is a possibility that the cartridge P has been replaced. In this case, the operation determining unit 304 stores a retraction history "present" in the RAM 209 as retraction history information (S3). In other words, when the detection unit detects that the fixing unit has moved from the first position to the second position in a state where the opening/closing detecting unit detects that the opening/closing member is at the open position, the control unit 1C causes the storage unit to store information indicating that there is a possibility that the unit has been replaced. Note that, it is assumed that, at the time when the door 20 is opened, the retraction history information is a retraction history "absent", which is an initial value.

Based on the closing of the door 20, the operation executing unit 305 executes or does not execute an initializing operation accompanying cartridge replacement according to the retraction history information determined by the operation determining unit 304 (S4 to S8). That is, the opening/closing detecting unit 301 detects that the door 20 has been moved from the open position to the closed position based on a signal of the door sensor 91 (S4).

When the door 20 has been moved to the closed position, the operation executing unit 305 accesses the RAM 209 and checks retraction history information (S5). In a case where the retraction history is "present", the operation executing unit 305 executes an initializing operation accompanying cartridge replacement (S6). In other words, when the opening/closing detecting unit detects that the opening/closing member has been moved from the open position to the closed position, the control unit 1C refers to information (retraction history information) in the storage unit and determines whether to execute the predetermined initializing operation. In a case where the retraction history is "absent", the operation executing unit 305 does not execute the initializing operation accompanying cartridge replacement (S7). The time from when the door 20 is closed until the printer 1 is allowed to start an image forming operation without executing an initializing operation accompanying the cartridge replacement is shorter than the time from when the door 20 is closed until the printer 1 is allowed to start an image forming operation after executing an initializing operation accompanying cartridge replacement.

The operation determining unit 304 clears the retraction history information after the door 20 is closed regardless of whether the initializing operation accompanying cartridge replacement is executed or not (S8). That is, the retraction history information is initialized to a retraction history "absent". When no movement of the door 20 from the open position to the closed position has been detected (No in S4), the process returns to the start without clearing the retraction history information, and the above-described process is continued.

In this manner, when it is detected that the fixing unit 80 has been moved to the retracted position during a period in which the door 20 is open, the control unit 1C of the present embodiment executes an initializing operation accompanying cartridge replacement based on the closing of the door 20. On the other hand, when no movement of the fixing unit 80 to the retracted position has been detected during a period in which the door 20 is open, the control unit 1C does not execute an initializing operation accompanying cartridge replacement based on the closing of the door 20. In other words, when the detection unit detects that the fixing unit has been moved from the first position to the second position during a period from a movement of the opening/closing member from the closed position to the open position to a movement of the opening/closing member from the open position to the closed position, the control unit of the present embodiment executes a predetermined initializing operation of bringing the unit to be usable for an image forming operation based on the movement of the opening/closing member to the closed position. On the other hand, when the detection unit does not detect a movement of the fixing unit from the first position to the second position during the above-described period, the control unit of the present embodiment does not execute the predetermined initializing operation based on the movement of the opening/closing member to the closed position.

When no movement of the fixing unit 80 to the retracted position is detected during a period in which the door 20 is open, there is a high possibility that the cartridge P has not been replaced. Therefore, in this case, by not executing an initializing operation accompanying cartridge replacement based on the closing of the door 20, it is possible to prevent a case where an initializing operation that is not actually required is executed. Then, it is possible to prevent an execution of an unnecessary initializing operation, which makes long a period (down time) from when the door 20 is closed until the printer 1 is allowed to start an image forming operation.

In addition, the cartridge P is a consumable item in which toner contained therein is consumed when a toner image is created, and the toner is consumed to create a toner pattern in a cartridge presence/absence detecting operation for the initializing operation accompanying cartridge replacement. In addition, the lifespans of the cartridge P, the fixing unit 80, and the transfer unit 40 may be set, for example, based on the cumulative rotation amount of the photosensitive drum 61, the transfer belt 41, or the heating roller, and an unnecessary initializing operation may unnecessarily increase the cumulative rotation amount. According to the present embodiment, it is possible to prevent a consumable item from being consumed in an accelerated rate by an execution of an unnecessary initializing operation.

As described above, according to the present embodiment, it is possible to provide an image forming apparatus capable of reducing an unnecessary initializing operation.

Second Embodiment

In the first embodiment, an example of determining whether to execute an initializing operation based on detection result of the retraction sensor 90 that detects a movement of the fixing unit 80 has been described. In the second embodiment, an example of detecting a movement of the fixing unit 80 from the use position to the retracted position with a cheaper configuration will be described. Hereinafter, unless otherwise specified, elements denoted by the same reference signs as those in the first embodiment have basically the same configurations and operations as those described in the first embodiment, and differences from the first embodiment will be mainly described.

Functional Block

Figure 8:
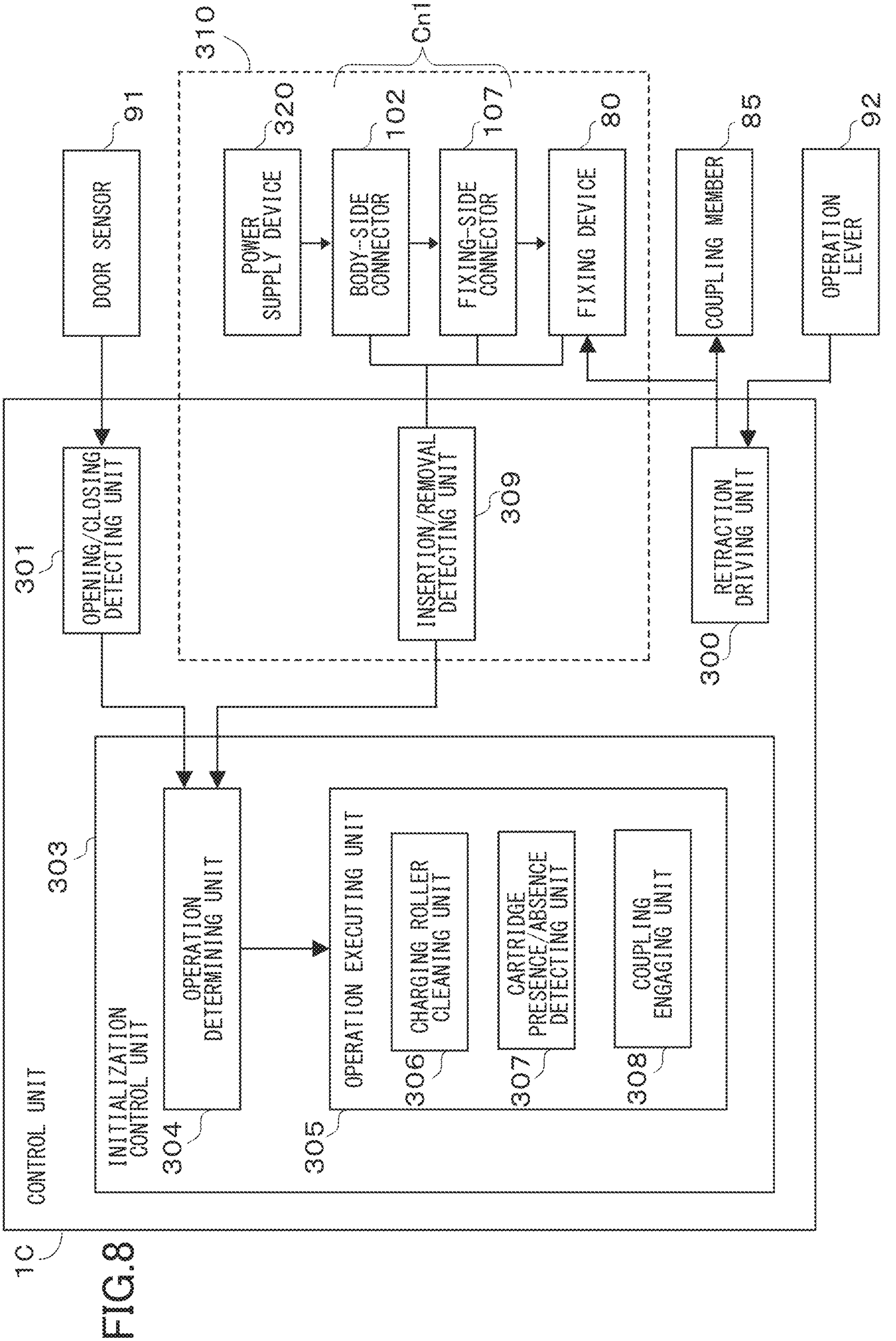
FIG. 8 is a functional block diagram of an image forming apparatus according to a second embodiment.

Next, functional blocks of the control unit 1C in the second embodiment will be described with reference to FIG. 8. The control unit 1C includes a retraction driving unit 300, an opening/closing detecting unit 301, an insertion/removal detecting unit 309, and an initialization control unit 303.

The printer 1 includes an insertion/removal detecting system 310. The insertion/removal detecting system 310 includes a fixing unit 80, a power supply device 320 that supplies power to the fixing unit 80, a body-side connector 102 connected to the power supply device 320, a fixing-side connector 107 provided in the fixing unit 80, and an insertion/removal detecting unit 309 of the control unit 1C. The insertion/removal detecting system 310 will be described in detail below.

The body-side connector 102 and the fixing-side connector 107 are insertable and removable connector units Cn1. The fixing unit 80 is electrically connected to the power supply device 320 and the control unit 1C via the fixing-side connector 107 and the body-side connector 102.

Figure 9:
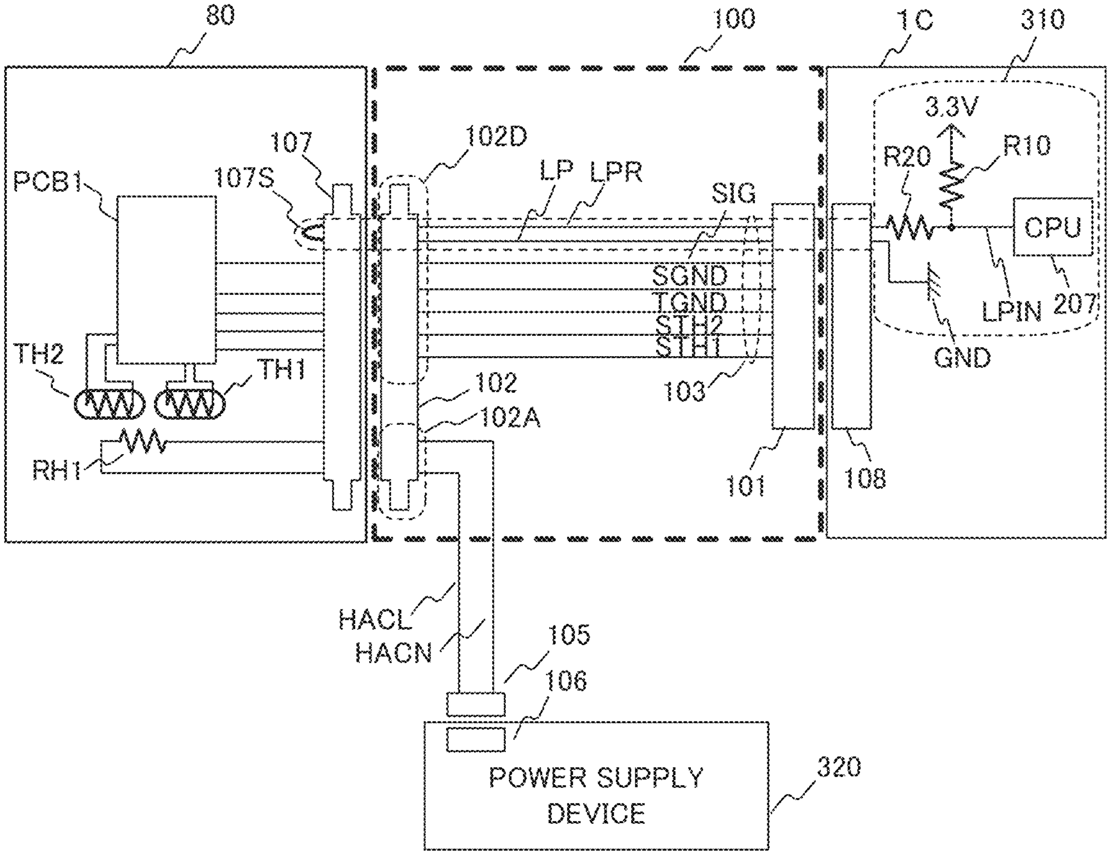
FIG. 9 is a circuit diagram according to the second embodiment.

The fixing unit 80 includes a heating element RH1, thermistors TH1 and TH2, and a relay board PCB1 (FIG. 9). The heating element RH1 is a heating resistor that generates Joule heat when electricity is applied thereto. The thermistors TH1 and TH2 are temperature detection elements for detecting a temperature of the heating element RH1.

One of the body-side connector 102 and the fixing-side connector 107 is a receptacle type connector, and the other of the body-side connector 102 and the fixing-side connector 107 is a plug type connector. In the present embodiment, the body-side connector 102 and the fixing-side connector 107 are so-called drawer connectors. The drawer connector is a connector unit that includes, for example, a guide resin housing provided outside a contact member (terminal) and a floating mechanism that absorbs misalignment between connectors, enabling stable connection even when the connectors are frequently inserted/removed.

In the present embodiment, the body-side connector 102 and the fixing-side connector 107 are disconnected when the fixing unit 80 moves from the use position to the retracted position. The insertion/removal detecting unit 309 is an example of a detection unit capable of detecting a movement of the fixing unit 80 from the use position (first position) to the retracted position (second position). The insertion/removal detecting unit 309 is configured to detect whether the body-side connector 102 and the fixing-side connector 107 are connected (connected state and fitted state) or disconnected (unconnected state and removed state). That is, the insertion/removal detecting unit 309 is configured to detect that the body-side connector 102 (first connector) and the fixing-side connector 107 (second connector) are disconnected.

In the second embodiment, the movement of the fixing unit 80 from the use position to the retracted position is determined based on a detection result of the insertion/removal detecting unit 309. Therefore, in the second embodiment, it is not necessary to add a retraction sensor 90 as in the first embodiment, making it possible to reduce an unnecessary initializing operation with a cheaper configuration.

Insertion/Removal Detecting System

The insertion/removal detecting system 310 will be described with reference to FIG. 9. The insertion/removal detecting system 310 includes a cable 100. The body-side connector 102 is provided at one end of the cable 100. The cable 100 includes an AC connector 105, a DC connector 101, an AC line HACL, an AC line HACN, and a DC wire bundle 103.

The body-side connector 102 is a connector in which an AC connector portion 102A for supplying an AC voltage and a DC connector portion 102D for transmitting a DC voltage or a DC signal are integrated. The AC connector 105 is a connector for alternating current, and the DC connector 101 is a connector for transmitting a DC voltage, a ground potential, and a DC signal. The AC connector 105 and the DC connector 101 are provided at an end of the cable 100 on a side opposite to the body-side connector 102. The AC connector 105 is connected to an AC connector 106 of the power supply device 320. The DC connector 101 is connected to a DC connector 108 of the control unit 35.

The AC line HACL and the AC line HACN are wires for alternating current. One end of the AC line HACL and one end of the AC line HACN are connected to the AC connector portion 102A of the body-side connector 102. The other end of the AC line HACL and the other end of the AC line HACN are connected to the AC connector 105. The AC line HACL is electrically connected to one end of the heating element RH1 via the body-side connector 102 and the fixing-side connector 107. The AC line HACN is electrically connected to the other end of the heating element RH1 via the body-side connector 102 and the fixing-side connector 107. The AC line HACL and the AC line HACN are power supply lines for supplying power to the heating element RH1 of the fixing unit 80.

The DC wire bundle 103 is a wire for direct current. One end of the DC wire bundle 103 is connected to the DC connector portion 102D of the body-side connector 102, and the other end of the DC wire bundle 103 is connected to the DC connector 101. The DC wire bundle 103 includes a plurality of wires. The plurality of wires include signal lines STH1, STH2, LP, LPR, SIG, and ground lines TGND and SGND.

The signal lines STH1 and STH2 and the ground lines TGND and SGND are electrically connected to the relay board PCB1 via the body-side connector 102 and the fixing-side connector 107. The thermistor TH1 and the thermistor TH2 are also connected to the relay board PCB1. In the relay board PCB1, the grounds of the thermistor TH1 and the thermistor TH2 are combined into one. The one-combined ground is electrically connected to the ground line TGND of the DC wire bundle 103.

The CPU 207 is electrically connected to the thermistors TH1 and TH2 via the DC connector 108, the signal lines STH1 and STH2, the ground line TGND, the DC connector portion 102D of the body-side connector 102, the fixing-side connector 107, and the relay board PCB1. Therefore, the CPU 207 can detect a temperature of the heating element RH1 by acquiring output signals of the thermistors TH1 and TH2. When an image is formed, the CPU 207 controls the power supply to the heating element RH1 based on signals of the thermistors TH1 and TH2, and maintains the fixing nip at a target temperature (fixing temperature) suitable for fixing the image.

The signal line LP is electrically connected to the signal line LPR via the body-side connector 102 and the fixing-side connector 107. Among a plurality of terminals of the fixing-side connector 107, terminals corresponding to the signal lines LP and LPR are short-circuited by a short-circuit line 107S.

The signal line SIG is electrically connected to the relay board PCB1 via the body-side connector 102 and the fixing-side connector 107, and is further connected to the ground line SGND through the relay board PCB1.

Next, the insertion/removal detecting system 310 will be described. The insertion/removal detecting system 310 includes an input terminal LPIN of the CPU 207, a resistor R10 (pull-up resistor), a resistor R20, and a ground GND. In addition, the insertion/removal detecting system 310 includes signal lines the LP and LPR of the DC wire bundle 103, the short-circuit line 107S of the fixing unit 80, the DC connectors 101 and 108, and the body-side connector 102. The input terminal LPIN of the CPU 207 is connected to one end of the resistor R10 and one end of the resistor R20. The other end of the resistor R10 is connected to a 3.3 V DC power supply. The other end of the resistor R20 is electrically connected to the signal line LP via the DC connectors 101 and 108. The signal line LPR is electrically connected to (grounded by) the ground GND via the DC connectors 101 and 108.

The short-circuit line 107S of the fixing unit 80 functions as a switch that opens and closes a circuit of the insertion/removal detecting system 310. That is, when the body-side connector 102 and the fixing-side connector 107 are connected, the circuit is closed, and a low-level voltage is input to the input terminal LPIN of the CPU 207. When the body-side connector 102 and the fixing-side connector 107 are disconnected, the circuit is open, and a high-level voltage is input to the input terminal LPIN of the CPU 207.

Hereinafter, information regarding whether the connector units Cn1 are in the disconnected state during a period in which the door 20 is open will be referred to as "disconnection history information". The disconnection history information indicating that the connector units Cn1 are in the disconnected state is set to a disconnection history "present". The disconnection history information indicating that the connector units Cn1 are not in the disconnected state is set to a disconnection history "absent".

Control Flow

Figure 10:
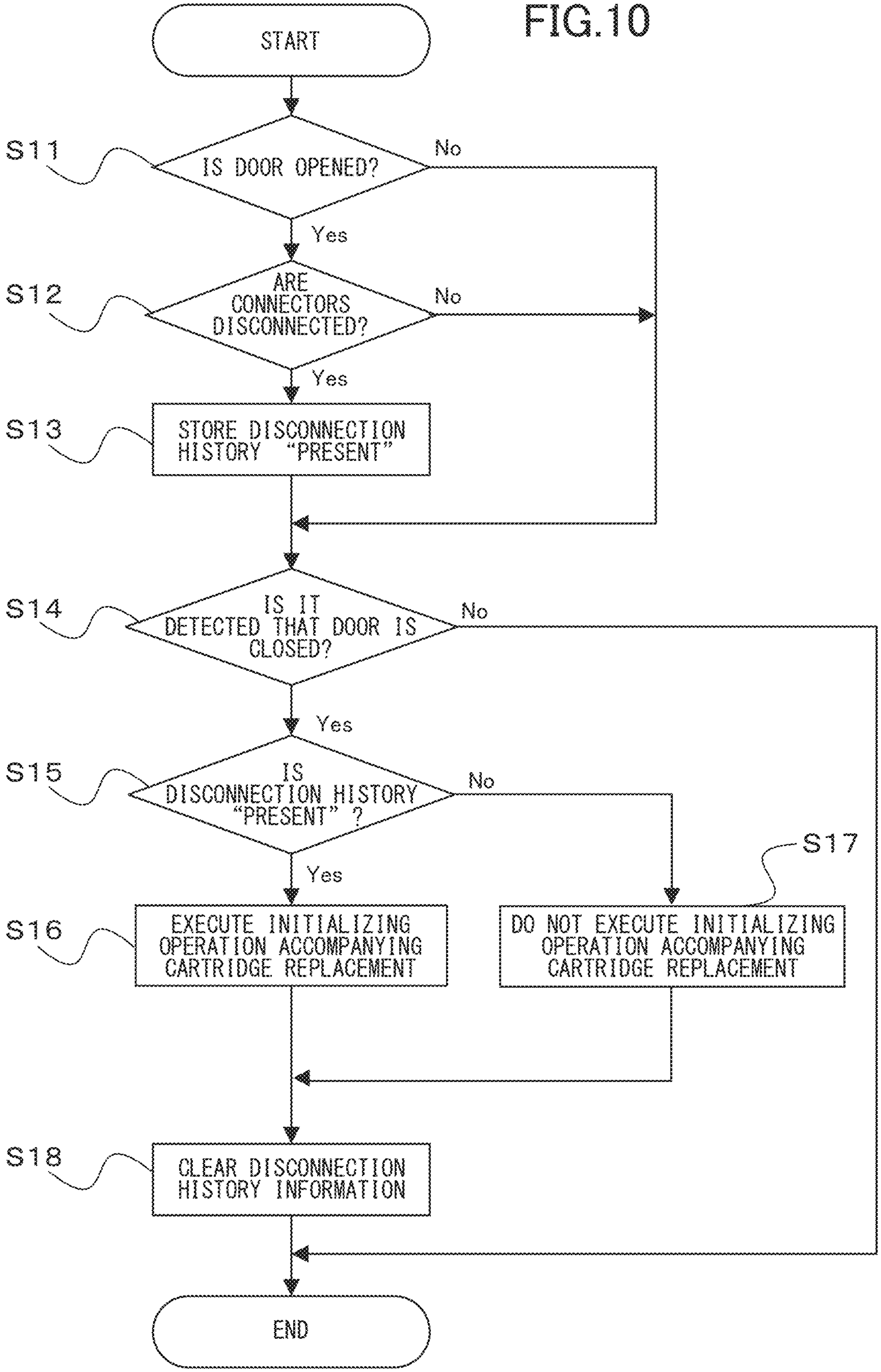
FIG. 10 is a flowchart illustrating control according to the second embodiment.

Next, a control flow of an initializing operation in the present embodiment will be described with reference to FIG. 10. The flowchart illustrated in FIG. 10 is started when an image forming operation is completed. That is, this flow is continuously executed during a period in which the main power supply of the printer 1 is turned on and the printer 1 is not executing an image forming operation (when no image is formed). Each step of this flow is executed by any functional block of the control unit 1C.

The operation determining unit 304 monitors whether the fixing unit 80 is retracted while the door 20 is open based on detection results of the opening/closing detecting unit 301 and the insertion/removal detecting unit 309 (S11 to S13). That is, the opening/closing detecting unit 301 detects whether the door 20 of the apparatus body 1A is at the open position based on a signal of the door sensor 91 (S11). The insertion/removal detecting unit 309 detects whether the connector units Cn1 are disconnected based on an input signal to the input terminal LPIN of the CPU 207 (S12). When a high-level input signal is input to the input terminal LPIN, the insertion/removal detecting unit 309 determines that the connector units Cn1 are disconnected (disconnected state). When the insertion/removal detecting unit 309 detects a disconnected state between the connector unit Cn1 in a state where the opening/closing detecting unit 301 detects that the door 20 is opened (Yes in S11→Yes in S12), the operation determining unit 304 determines that there is a possibility that the cartridge P has been replaced. In this case, the operation determining unit 304 stores a disconnection history "present" in the RAM 209 as disconnection history information (S13). Note that, it is assumed that, at the time when the door 20 is opened, the disconnection history information is a disconnection history "absent", which is an initial value.

The operation executing unit 305 executes an initializing operation according to the disconnection history information determined by the operation determining unit 304 based on the closing of the door 20 (S14 to S18). That is, the opening/closing detecting unit 301 detects that the door 20 has been moved from the open position to the closed position based on a signal of the door sensor 91 (S14). When the door 20 has been moved to the closed position, the operation executing unit 305 accesses the RAM 209 and checks disconnection history information (S15). In a case where the disconnection history is "present", the operation executing unit 305 executes an initializing operation accompanying cartridge replacement (S16). In a case where the disconnection history is "absent", the operation executing unit 305 does not execute an initializing operation accompanying cartridge replacement (S17).

The operation determining unit 304 clears the disconnection history information after the door 20 is closed regardless of whether the initializing operation accompanying cartridge replacement is executed or not (S18). That is, the disconnection history information is initialized to a disconnection history "absent". When no movement of the door 20 from the open position to the closed position has been detected (No in S14), the process returns to the start without clearing the disconnection history information, and the above-described process is continued.

In this manner, when it is detected that the fixing unit 80 has been moved to the retracted position during a period in which the door 20 is open, the control unit 1C of the present embodiment executes an initializing operation accompanying cartridge replacement based on the closing of the door 20. On the other hand, when no movement of the fixing unit 80 to the retracted position has been detected during a period in which the door 20 is open, the control unit 1C does not execute an initializing operation accompanying cartridge replacement based on the closing of the door 20.

Therefore, according to the present embodiment, similarly to the first embodiment, it is possible to provide an image forming apparatus capable of reducing an unnecessary initializing operation.

Further, according to the present embodiment, a movement of the fixing unit 80 from the use position to the retracted position is detected by detecting a disconnected state between the connector units Cn1. Therefore, an unnecessary initializing operation can be reduced with a configuration simpler than that of the first embodiment.

Other Modifications

In the above-described embodiment, the configuration has been described in which the cartridge P is allowed to be attached and detached in a state where the fixing unit 80 is moved to the retracted position, and the cartridge P cannot be attached and detached when the fixing unit 80 is at the use position. The present disclosure is not limited thereto, and a unit (replacement unit) to be attached to and detached from the apparatus body 1A in a state where the fixing unit 80 is moved to the retracted position may be, for example, the transfer unit 40 or a waste toner collection unit.

In a case where the replacement unit is the transfer unit 40, the predetermined initializing operation may be an operation of cleaning the transfer belt 41 and/or a new item detecting operation of detecting whether the transfer unit 40 is new. In a case where the replacement unit is a waste toner collection unit, the predetermined initializing operation may be a new item detecting operation of detecting whether the collection unit is new. The operation of cleaning the transfer belt 41 is an operation of cleaning toner that may have scattered on the surface of the transfer belt 41 using the cleaning unit 43 or the like by rotationally driving the transfer belt 41 for a predetermined time. The new item detecting operation is an operation of detecting whether the transfer unit 40 or the collection unit is new, for example, by the control unit 1C reading information from a memory attached to the transfer unit 40 or the collection unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-039386, filed Mar. 13, 2024, which is hereby incorporated by reference herein in its entirety.

What is claimed is:

1. An image forming apparatus comprising:

an apparatus body provided with an opening portion;

an opening/closing member configured to move between a closed position where the opening portion is closed and an open position where the opening portion is open;

a fixing unit configured to move between a first position at which the fixing unit fixes an image on a recording material and a second position retracted from the first position;

a unit used in an image forming operation of forming the image on the recording material, the unit being configured to be attached to and detached from the apparatus body through the opening portion in a state where the opening/closing member is at the open position and the fixing unit is at the second position; and a control unit configured to execute a predetermined initializing operation of bringing the unit attached to the apparatus body to be usable for the image forming operation, the control unit being configured to:

execute the predetermined initializing operation based on a movement of the opening/closing member from the open position to the closed position, in a case where the control unit detects a movement of the fixing unit from the first position to the second position during a period from a movement of the opening/closing member from the closed position to the open position to the movement of the opening/closing member from the open position to the closed position; and not execute the predetermined initializing operation even if the opening/closing member is moved to the closed position, in a case where the control unit does not detect the movement of the fixing unit from the first position to the second position during the period.

2. The image forming apparatus according to claim 1, further comprising:

a sensor configured to output a signal in accordance with a position of the fixing unit, wherein the control unit is configured to detect the movement of the fixing unit from the first position to the second position based on the signal of the sensor.

3. The image forming apparatus according to claim 1, further comprising:

a first connector disposed in the apparatus body and electrically connected to the control unit; and a second connector disposed in the fixing unit and configured to be connected to the first connector in a case where the fixing unit is at the first position and to be disconnected from the first connector in a case where the unit is at the second position, wherein the control unit is configured to detect the movement of the fixing unit from the first position to the second position based on a disconnection between the first connector and the second connector.

4. The image forming apparatus according to claim 1, further comprising:

a retraction driving unit configured to execute an operation of retracting the fixing unit from the first position to the second position, wherein the retraction driving unit is configured to execute the operation of retracting the fixing unit based on an instruction from a user in a state where the opening/closing member is at the open position.

5. The image forming apparatus according to claim 1, further comprising:

a support member configured to support the unit, wherein the support member is movable to an inner position where the unit is accommodated inside the apparatus body and an outer position where the unit is pulled out to an outside of the apparatus body to allow the unit to be attached to and detached from the support member.

6. The image forming apparatus according to claim 5, wherein in a case where the fixing unit is at the first position, at least a part of the fixing unit is located inside a movement space in which the support member moves from the inner position to the outer position, and in a case where the fixing unit is at the second position, the fixing unit is entirely located outside the movement space.

7. The image forming apparatus according to claim 1, wherein the second position is above the first position, and the unit is configured to be attached to and detached from the apparatus body by passing below the fixing unit at the second position.

8. The image forming apparatus according to claim 1, wherein a time from when the opening/closing member is moved from the open position to the closed position until the image forming apparatus is allowed to start the image forming operation without executing the predetermined initializing operation is shorter than a time from when the opening/closing member is moved from the open position to the closed position until, after the predetermined initializing operation is executed, the image forming apparatus is allowed to start the image forming operation.

9. The image forming apparatus according to claim 1, wherein the control unit is configured to, in a case where the control unit does not detect the movement of the fixing unit from the first position to the second position during the period, start a preparing operation not including the predetermined initializing operation based on the movement of the opening/closing member from the open position to the closed position, and start the image forming operation after the preparing operation is completed.

10. The image forming apparatus according to claim 1, further comprising:

a sensor configured to output a signal depending on whether the opening/closing member is open or closed, wherein the control unit includes a storage unit, the control unit is configured to:

cause the storage unit to store information indicating that there is a possibility that the unit has been replaced, in a case where the control unit determines that the opening/closing member is at the open position based on the signal from the sensor and detects the movement of the fixing unit from the first position to the second position; and refer to the information in the storage unit to determine whether to execute the predetermined initializing operation, in a case where the control unit detects the movement of the opening/closing member from the open position to the closed position based on the signal from the sensor.

11. The image forming apparatus according to claim 1, wherein the unit is a cartridge including at least one member selected from a group including a photosensitive drum, a charging member configured to charge the photosensitive drum, a developing member configured to perform development by supplying developer to the photosensitive drum, and a cleaning member configured to remove toner adhering to a surface of the photosensitive drum.

12. The image forming apparatus according to claim 11, wherein the cartridge includes the charging member, and the predetermined initializing operation is an operation of cleaning the charging member.

13. The image forming apparatus according to claim 11, wherein the predetermined initializing operation is an operation of detecting whether the cartridge is present or absent.

14. The image forming apparatus according to claim 11, wherein the cartridge includes the photosensitive drum, and the predetermined initializing operation is an operation of engaging a coupling disposed in the apparatus body and a coupling disposed in the cartridge, to enable transmission of drive from a drive source disposed in the apparatus body to the photosensitive drum.

15. The image forming apparatus according to claim 1, wherein the unit includes an intermediate transfer member configured to bear a toner image primarily transferred from a photosensitive drum for secondary transfer to the recording material.

16. The image forming apparatus according to claim 15, wherein the predetermined initializing operation is an operation of cleaning the intermediate transfer member or an operation of detecting whether the unit is new.

17. The image forming apparatus according to claim 1, wherein the unit is a collection unit configured to accommodate waste toner collected from a photosensitive drum or from an intermediate transfer member.

18. The image forming apparatus according to claim 17, wherein the predetermined initializing operation is an operation of detecting whether the collection unit is new.

* * * * *